United States Patent [19]
Erickson et al.

[11] Patent Number: 6,020,970
[45] Date of Patent: Feb. 1, 2000

[54] AFP TO POSTSCRIPT CONVERSION METHOD

[75] Inventors: Lars Patrick Erickson, Omaha, Nebr.; Tarry A. Hempel, Council Bluffs, Iowa

[73] Assignee: First Data Corporation, Hackensack, N.J.

[21] Appl. No.: 09/179,653

[22] Filed: Oct. 27, 1998

[51] Int. Cl.[7] .................................................. G06F 15/00
[52] U.S. Cl. ........................ 358/1.1; 358/1.6; 358/1.9; 707/523
[58] Field of Search ............................. 358/1.1, 1.6, 1.9; 707/523

[56] References Cited

U.S. PATENT DOCUMENTS

| | | | |
|---|---|---|---|
| 5,165,014 | 11/1992 | Vassar | 395/112 |
| 5,173,853 | 12/1992 | Kelly et al. . | |
| 5,220,674 | 6/1993 | Morgan | 395/800 |
| 5,227,643 | 7/1993 | Craig | 250/566 |
| 5,228,118 | 7/1993 | Sasaki | 395/112 |
| 5,283,887 | 2/1994 | Zachery . | |
| 5,287,194 | 2/1994 | Lobiondo | 358/296 |
| 5,287,434 | 2/1994 | Bain et al. | 393/101 |
| 5,327,526 | 7/1994 | Nomura | 395/115 |
| 5,345,091 | 9/1994 | Craig | 250/566 |
| 5,438,657 | 8/1995 | Nakatani . | |
| 5,504,891 | 4/1996 | Motoyama et al. . | |
| 5,506,985 | 4/1996 | Motoyama et al. . | |
| 5,559,933 | 9/1996 | Boswell | 395/114 |

*Primary Examiner*—Jerome Grant, II
*Attorney, Agent, or Firm*—Brooks & Kushman P.C.

[57] ABSTRACT

A document in AFP format is converted to a document in PostScript format. Each object in an AFP file is scanned. A check is made to determine if the scanned object is appropriate. If the scanned object is not appropriate, an error message is generated. If the scanned object is appropriate, the scanned object is converted to PostScript format. The converted object to is written to a PostScript file. If the scanned object is a text object, the converted object includes text, lines, and font changes. If the scanned object is a font object, an AFP font name is mapped to a Postscript font name which is added to a list of necessary fonts in the PostScript file.

6 Claims, 2 Drawing Sheets

AFP TO POSTSCRIPT CONVERSION METHOD

TECHNICAL FIELD

The present invention relates to converting AFP data to PostScript data.

BACKGROUND ART

Application programs often produce output for printing on paper. This output often includes text in a variety of fonts, images, graphics, bar codes, and the like. The application output may be expressed as a data stream comprising a well defined set of commands. These commands allow a computer to tell a printer what and where to print. The output data stream is often held in a file prior to printing. Many formats for data streams have been developed. Two of the most common data stream formats are PostScript and Advanced Function Presentation (AFP).

PostScript was developed by Adobe, Inc. PostScript was the first data stream having its own stack and programming language capabilities. PostScript includes scalable fonts, smooth greyscaling, and multiple orientations on the physical page. Enhancements to PostScript permit a set of operations to be grouped in a form, multiple methods for specifying color, and composite fonts for unlimited character sets. PostScript is a registered trademark of Adobe, Inc.

AFP presentation data streams include text and in-line resources, such as form definitions and page definitions, to construct a data stream that then points to overlays, page segments, fonts, and the like. AFP is all points addressable, meaning that any location on the printed page can be addressed by a command in the data stream.

A file holding a data stream in one format may have to be converted to another format. This may occur, for example, when transferring output data from an installation using the first data format to an installation using the second data format.

What is needed is an efficient method to convert a file written in the AFP format to a file written in the PostScript format.

SUMMARY OF THE INVENTION

It is an object of the present invention to provide a method for converting an AFP file to a PostScript file.

It is another object of the present invention to convert data in AFP format to PostScript format in an efficient manner.

Still another object of the present invention is to determine if objects encountered while scanning an AFP file are appropriate for conversion to PostScript format.

In carrying out the above objects and other objects and features of the present invention a method is provided for converting a document presented in AFP format to PostScript format. The method includes scanning an object in an AFP file. A check is made to determine if the scanned object is appropriate. If the scanned object is not appropriate, an error message is generated. If the scanned object is appropriate, the scanned object is converted to PostScript format. The converted object to is written to a PostScript file. This procedure is repeated if any object remains not scanned in the AFP file. If the scanned object is a text object, the converted object includes text, lines, and font changes. If the scanned object is a font object, an AFP font name is mapped to a Postscript font name which is added to a list of necessary fonts in the PostScript file.

In an embodiment of the present invention, converting the scanned object to PostScript format includes determining if the AFP object is an image object with compressed image data in the form of IBM modified modified relative addressing designation data. If so, the image object is converted to CCITT Group 4 compressed image data.

In another embodiment of the present invention the AFP format is a hierarchical structure of objects, each particular object having a set of allowed objects that may be correctly included within the particular object. Determining if the scanned AFP object is appropriate includes maintaining a hierarchical stack of open objects, the top of the stack corresponding to the most recently opened object. The scanned object is determined to be appropriate if the scanned object belongs to the set of allowed objects for the object on the top of the stack.

Another method is provided for converting a document presented in AFP format to PostScript format. The document in AFP format is stored in a first file and the converted PostScript document is stored in a second file. The method includes creating a scanner object. The AFP object in the first file is scanned with the scanner object. A check is made to determine if the scanned AFP object is appropriate and, if not, an error message is generated. If the scanned object is appropriate and the scanned object is a font object, the AFP font described by the font object is mapped to a PostScript font. If the appropriate scanned AFP object is not a font object, the AFP object is converted to PostScript code and written to the second file. The steps of scanning an AFP object, generating an error message if the AFP object is not appropriate, and, if the scanned AFP object is appropriate, mapping the font or converting the non-font object are repeated until all AFP objects are scanned. A reference to each mapped PostScript font is then added to the beginning of the second file.

The above objects and other objects, features, and advantages of the present invention are readily apparent from the following detailed description of the best mode for carrying out the invention when taken in connection with the accompanying drawings.

BEST MADE FOR CARRYING OUT THE INVENTION

Figure 1:
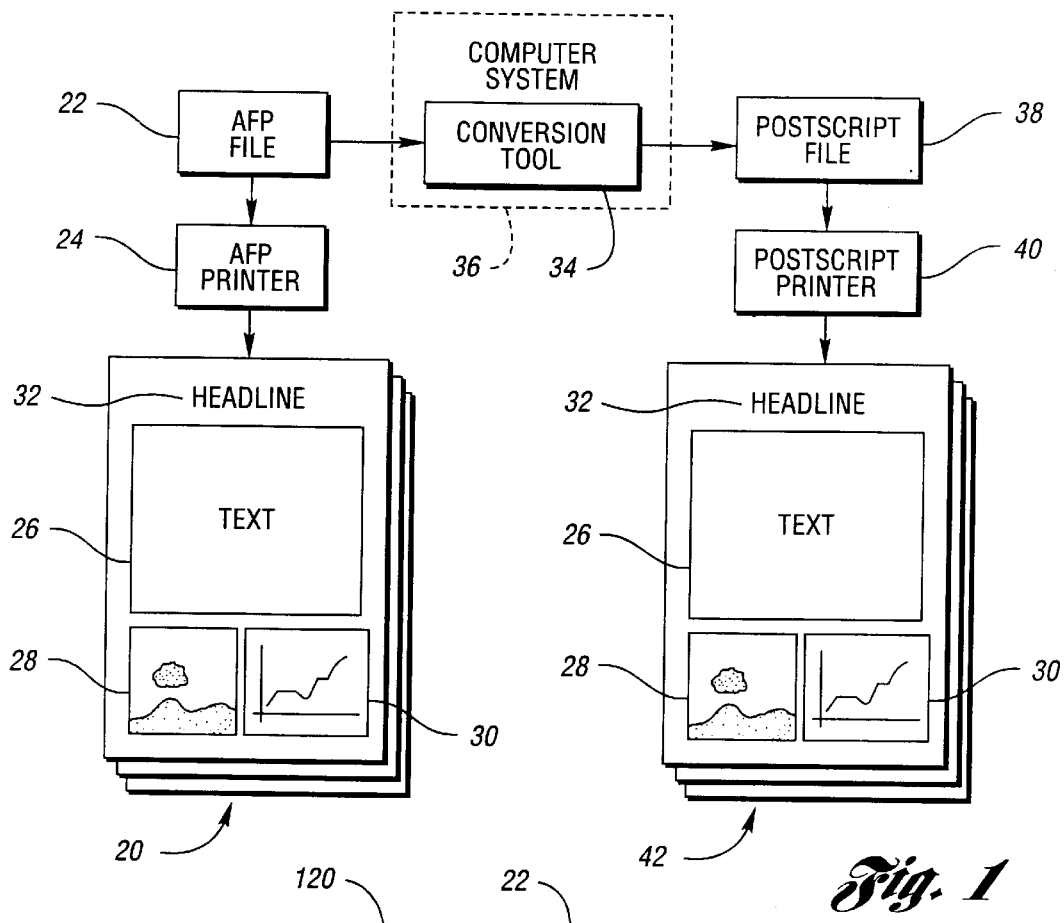
FIG. 1 is a schematic diagram of an AFP file, a PostScript file, and a conversion tool implementing a method according to the present invention.

Document 20 is the result of sending AFP file 22 to AFP printer 24. Items in document 20 may be represented by objects in AFP file 22. These objects are defined by object content architectures. For example, text block 26 may be described by an object having a Presentation Text Object Content Architecture (PTOCA). Image 28 may result from an object having the Image Object Content Architecture (IOCA). A graphical item 30 may be represented by an object having the Graphics Object Content Architecture (GOCA). Items described by one or more fonts, such as headline 32, may be described by an object having the Font Object Content Architecture (FOCA).

Objects and other data in AFP file 22 are described using structured fields. Each structured field has a unique three byte code followed by a two byte length integer. AFP objects are described by several structured fields. Generally, there will be a BEGIN field, one or more set-up fields, DATA fields, and an END field. Available fields and their meanings are well known in the art of AFP programming.

The method of the present invention is embodied in a conversion tool, shown as block 34. In a preferred embodiment, conversion tool 34 is designed to operate on computer system 36 such as a personal computer. Conversion tool 34 converts the data stream in AFP file 22 into a PostScript formatted data stream and writes the PostScript data stream into PostScript file 38. PostScript file 38 may be sent to PostScript printer 40 to produce document 42. When printed, document 42 should look substantially the same as document 20 printed from AFP file 22.

Figure 2:
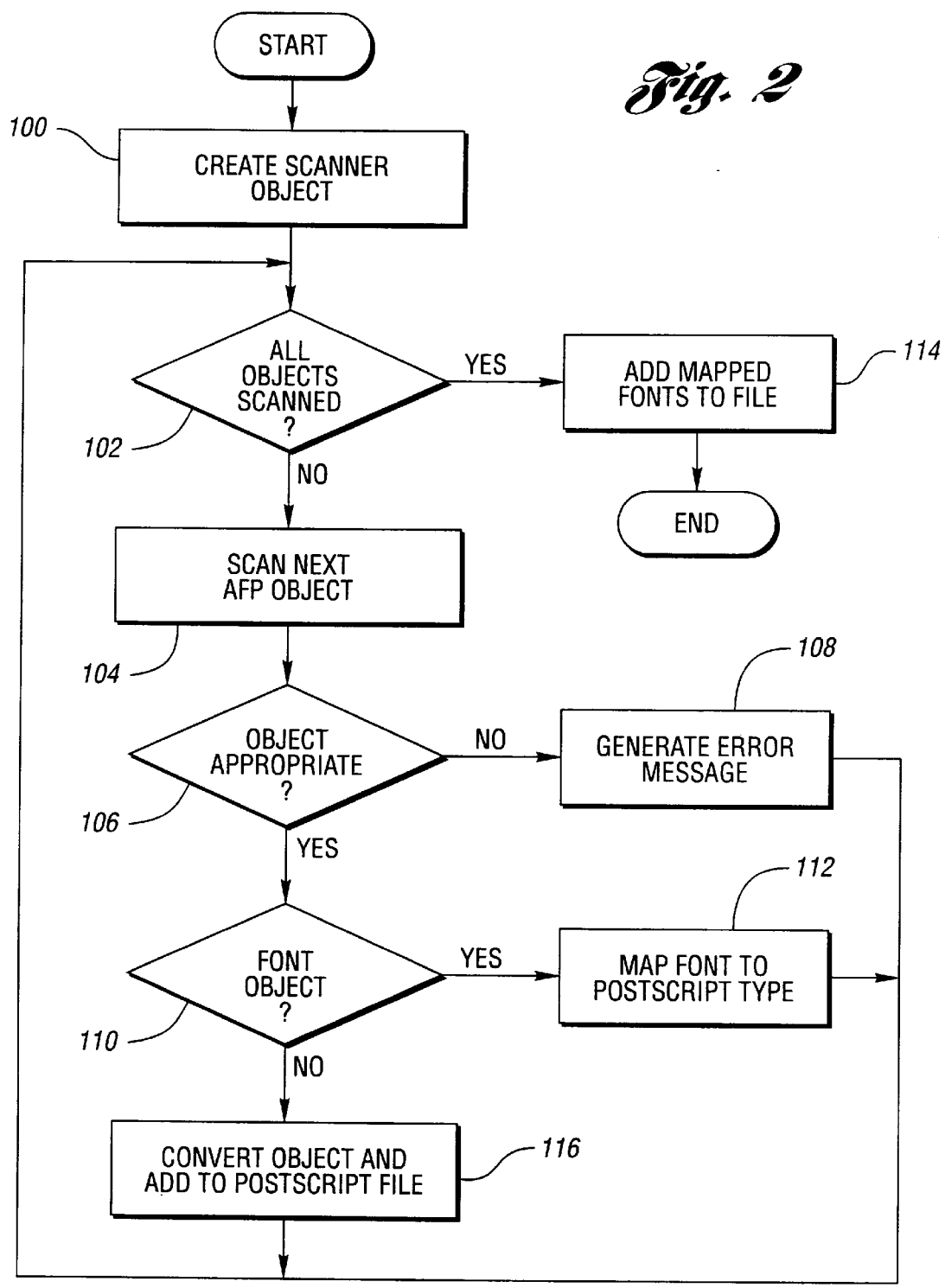
FIG. 2 is a flow diagram of a method according to the present invention.

Referring now to FIG. 2, a flow diagram of a method according to the present invention is shown. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration.

A scanner object is created in block 100. The scanner object processes the AFP data stream by reading AFP file 22. A check is made to determine if all objects have been scanned in block 102. If so, mapped fonts are added to PostScript file 38 as described with regards to block 114 below.

The next AFP object is scanned in block 104. If any AFP objects have not been scanned, a program object in conversion tool 34 is created to read fields pertaining to the AFP object. The program object is passed the scanner, an SFIELD object pointing to the current structured field, and various defining variables depending on the type of AFP object encountered. Once the structured fields belonging to the scanned AFP object have been processed by the program object, the program object is deleted.

A check is made to determine if the scanned AFP object is appropriate in block 106. Each structured field is checked to determine if that field is appropriate within the current object. If not, an error message is generated in block 108. A method for determining if a scanned structured field is appropriate is described with regards to FIG. 3 below.

A check is made to determine if the scanned object is a font object in block 110. If so, the font is mapped to a corresponding PostScript type font in block 112. One method to handle fonts is to interpret the bit-mapped images of the AFP fonts. In the preferred embodiment shown in FIG. 2, each AFP font encountered is mapped to a corresponding PostScript font and a reference is inserted in PostScript file 38. A list is maintained of all referenced PostScript font names. Once all objects have been scanned, the list of referenced PostScript font names is added to the head of PostScript file 38 in block 114.

Objects are converted and added to the PostScript file in block 116. The program object created to handle the scanned AFP object reads in structured fields from AFP file 22 and writes the appropriate PostScript data into PostScript file 38.

For example, if the AFP object is a graphics object, the graphical data format is determined. Possible data formats include uncompressed bitmapped images, International Business Machines Modified Modified Relative addressing designation (IBMMMR) format images, AFP Group 4 (G4) fax and coded images, and the like. Once the data format is determined, the AFP graphics object is converted to a G4 format image. For example, compressed IBMMMR image data is converted to CCITT G4 compressed image data. The G4 format image is then written to PostScript file 38.

Another example is overlay and page segments. Overlay and page segments encountered in AFP file 22 generally contain objects for producing text 26 and images 28. Overlays and page segments occur once in AFP file 22 and are referenced by name in AFP page data. Using the PostScript operator "execform", PostScript file 38 is arranged so that converted overlays and page segments are stored once at the beginning of PostScript file 38 and then referenced by name when used on a page.

Figure 3:
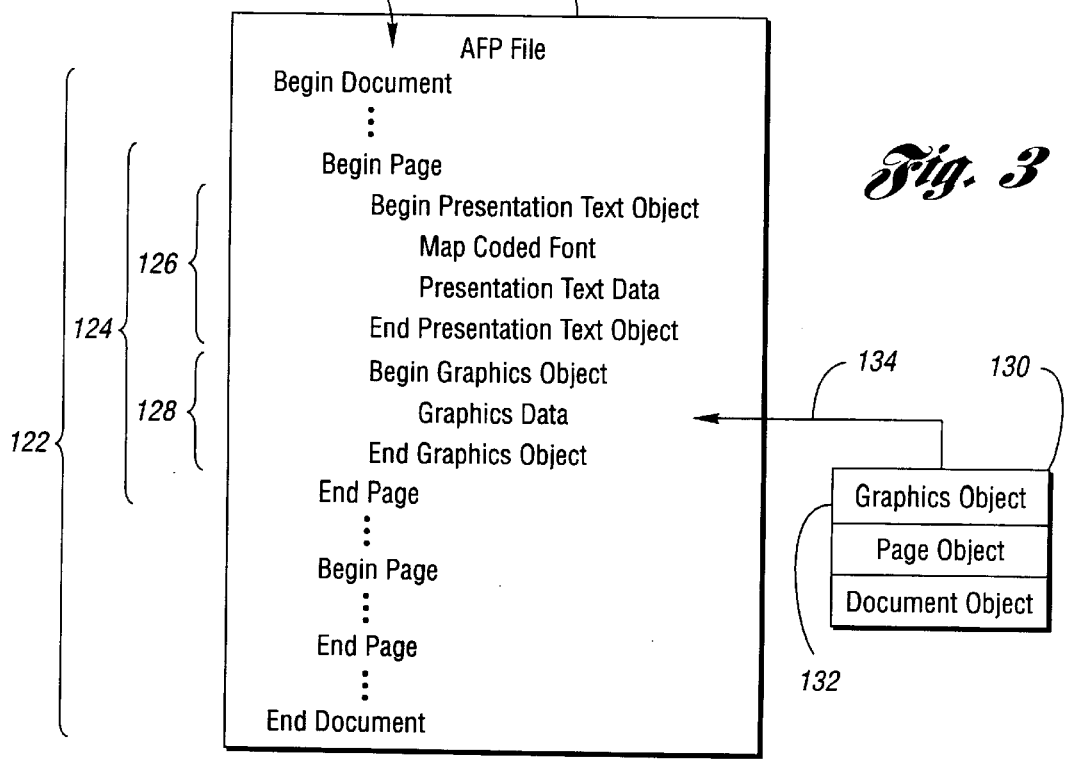
FIG. 3 is a schematic diagram showing a conceptualized AFP file and an object stack which may be implemented as part of the present invention.

Referring now to FIG. 3, a schematic diagram of a conceptualized AFP file and an object stack that may be implemented as part of the present invention is shown. AFP data stream 120 describes hierarchical arrangements of objects describing document 20. For example, the first object encountered may be document object 122. Within document object 122 may be one or more page objects 124. Each page object 124 may contain further objects such as text object 126 and graphics object 128. In order to determine if a scanned structured field is appropriate, a hierarchical list of open objects is maintained. Stack 130 holds the hierarchical list of open objects. Stack top 132 contains the type of the most recently opened object. For the example shown in FIG. 3, SFIELD pointer 134 is pointing at a graphics data structured field. Stack 130 shows that a graphics object was most recently opened because graphics object is in stack top 132. Stack 130 also shows that the graphics object is within a page object and that the page object is within a document object.

An implementation of the present invention was written in $C^{++}$ using a $g^{++}$ compiler on a LINUX platform.

While the best mode for carrying out the invention has been described in detail, other possibilities exist within the spirit and scope of the present invention. Those familiar with the art to which this invention relates will recognize various alternative designs and embodiments for practicing the invention as defined by the following claims.

What is claimed is:

1. A method for converting a document represented in Advanced Function Presentation (AFP) format to a PostScript format comprising:

scanning an object in an AFP file;

determining if the scanned object is appropriate;

if the scanned object is determined to be not appropriate, generating an error message;

if the scanned object is determined to be appropriate, converting the scanned object to PostScript format;

writing the converted object to a PostScript file; and repeating scanning, determining, one of generating and converting, and writing if any object remains not scanned in the AFP file;

wherein, if the scanned object is a text object, the converted object comprises text, lines, and font changes; and wherein, if the scanned object is a font object, an AFP font name is mapped to a Postscript font name which is added to a list of necessary fonts in the PostScript file.

2. A method as in claim 1 wherein converting the scanned object to PostScript format comprises:

determining if the AFP object is an image object with compressed image data in the form of IBMMMR data; and converting the determined object image data to CCITT Group 4 compressed image data.

3. A method as in claim 1 wherein the AFP format is a hierarchical structure of objects, each particular object having a set of allowed objects that may be correctly included within the particular object, determining if the scanned AFP object is appropriate comprises:

maintaining a hierarchical stack of open objects, the top of the stack corresponding to the most recently opened object; and determining the scanned object as appropriate if the scanned object belongs to the set of allowed objects for the object on the top of the stack.

4. A method for converting a document represented in Advanced Function Presentation (AFP) format to PostScript format wherein the document in AFP format is stored in a first file and the converted PostScript document is stored in a second file, the method comprising:

creating a scanner object;

scanning an AFP object in the first file with the scanner object;

determining if the scanned AFP object is appropriate and, if not appropriate, generating an error message;

if the scanned object is appropriate and the scanned AFP object is a font object, mapping the AFP font described by the font object to a mapped PostScript font;

if the scanned AFP object is appropriate and the scanned AFP object is not a font object, converting the AFP object to PostScript code and writing the PostScript code to the second file;

repeating the steps of scanning an AFP object, generating an error message if the AFP object is not appropriate, mapping the font if the AFP object is an appropriate font object, and converting the appropriate non-font AFP object if all AFP objects are not yet scanned; and adding a reference to each mapped PostScript font to the second file.

5. A method as in claim 4 wherein converting the AFP object to PostScript code and writing the PostScript code to the second file comprises:

determining if the AFP object is an image object;

if the AFP object is an image object, determining the image data format;

converting the image object to a G4 format image based on the determined image data format; and writing the converted G4 image to the second file.

6. A method as in claim 4 wherein the AFP format is a hierarchical structure of objects, each particular object having a set of allowed objects that may correctly be described within the particular object, determining if the scanned AFP object is appropriate comprising:

maintaining a hierarchical stack of open objects, the top of the stack corresponding to the most recently opened object; and determining the scanned object as appropriate if the scanned object belongs to the set of allowed objects for the object on the top of the stack.

* * * * *